United States Patent Office.

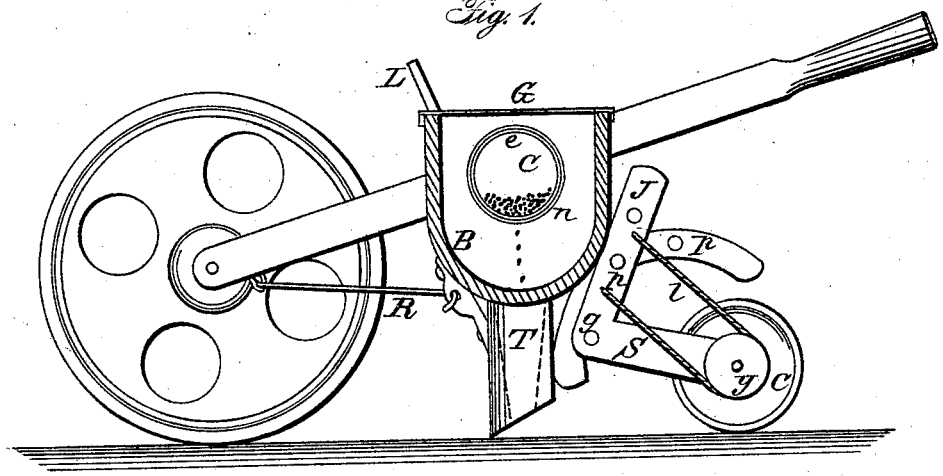

M. D. CONE, OF PORT GIBSON, AND A. N. DOUGLASS, OF AVON, NEW YORK.

*Letters Patent No. 63,854, dated April 16, 1867.*

---

IMPROVEMENT IN HAND-SEEDING MACHINE.

---

*The Schedule referred to in these Letters Patent and making part of the same.*

---

TO ALL WHOM IT MAY CONCERN:

Be it known that we, M. D. CONE, of Port Gibson, in the county of Ontario, and State of New York, and A. N. DOUGLASS, of Avon, in the county of Livingston, and State aforesaid, have invented certain new and useful "Improvements in Seeding Machines;" and we do hereby declare that the following is a full, clear, and exact description thereof, reference being had to the accompanying drawings, making part of this specification, in which—

Figure 1 is a side elevation of our invention, the case B and the revolving seed cylinder C being shown in vertical section in the plane of the red line $x$ in fig. 2.

Figure 2 is a top view of one portion of the same, the cover G of that case being removed.

Figure 3 is a horizontal section of the revolving seed cylinder C.

Like letters indicate corresponding parts in the several figures.

This invention relates more especially to hand or garden-seed planters, and it consists, mainly, of a revolving seed cylinder having perforations through which the seed is discharged, the capacity of the seed perforations being regulated by an adjustable band or tire, which has different-sized holes, and in enclosing the seed chamber in suitable protectors or cases; and also in the arrangement of these seeders in connection with a barrow so as to be drawn by the same.

To enable others to make and use our invention we will describe its construction and operation.

We employ the same barrow shown and described in our application for patent cultivators, and attach the seeding devices to it by draught-rods R and a hinged lifter, L. This lifter is hinged to the locking-head H. The slotted bars E are rigidly attached to the casing or drums B, and lap under the locking-head, to which they are clamped by the screw-bolts $b$. The cases or drums B are provided with a hollow shank or conducting-tube, T, which also act as furrowing teeth. The draught-rods R are hooked into an eye, cast or otherwise attached to the front of the shank. The hanger-strap P is bolted to the rear of the case B, and the traverse-wheel or roller O is hinged to it by a forked shank, S, at $g$, as shown in fig. 1, in such a manner as to permit the wheel to be raised or lowered by changing a pin, $p$, from one hole to another in the arm J and strap P. The grain cylinder C may be made cylindrical, as shown, or spherical, or any other suitable form. The heads $h$ and $h'$ are cast, $h'$ being riveted to the cylinder, and $h$ is made to slip over the other end. There is a pivot, $f$, on head $h'$ to fit in a corresponding recess in the case. The head $h$ has a pulley, $k$, cast upon it, and a recess, $i$, to receive the point of the set-screw $q$, upon which that end of the cylinder runs. There is a pulley, $y$, on the axle of the ground-wheel, and a cord, $l$, or a chain, drives the grain cylinder from this pulley. The cylinders C have openings $e$ large enough to discharge the coarsest grain ever intended to be sown by the machine. The discharge through these openings is regulated by the adjustable band $n$, which has a series of different-sized holes, either of which may be turned so as to register to those in the cylinder, where the band is held by the spring latches $m$, the points resting in openings made for the purpose, or the quantity of seed to be sown may be regulated by having several bands, each having different-sized grain or seed holes. The diameter of the cylinder may be enlarged at the line of the seed perforations so as to cause the seed to continue to discharge until the last shall be deposited, or the heads may be cast spherical and made to meet by a cylindrical rim projecting from each and one fitting within the other. These rims are perforated so as to answer for the perforations in the other cylinder and the band. They may be set so as to regulate the quantity of seed deposited at each revolution. The cylinders are fitted and the loose head put on, and the whole placed in position, as shown in fig. 2, the driving-band $l$ being arranged upon the pulley, where it is held by the pivot-screw $q$. The seeders are represented in the drawings as being loaded upon the barrow as for transportation over the ground. When they are to act the pin $t$ is removed from the lifter L, when the handles would be raised above the top of the cases B, consequently, when desired, the two seeders may be drawn in so as to drill only three or four inches apart.

What we claim as our invention, and desire to secure by Letters Patent, is—

1. Suspending the seeding apparatus from the front of a hand-barrow, by which they are drawn, substantially in the manner and for the purposes shown and described.

2. The employment or use of the revolving seed cylinder C when it is made to contain the supply of grain, substantially as and for the purposes set forth.

3. Enclosing the grain cylinder C within the casing B for the purpose of concentrating the seed after leaving the distributing cylinder and conveying it to the drill through the conductor.

4. The adjustable perforated band $n$, in combination with the revolving seed cylinder C, substantially as and for the purposes set forth.

M. D. CONE,
A. N. DOUGLASS.

Witnesses:
WM. S. LOUGHBOROUGH,
P. T. TURNER.